(12) United States Patent
Nakata

(10) Patent No.: US 6,721,443 B1
(45) Date of Patent: Apr. 13, 2004

(54) METHOD OF READING MARK AND APPARATUS FOR THE SAME

(75) Inventor: Kunimasa Nakata, Tokyo (JP)

(73) Assignee: TDK Corporation, Tokyo (JP)

( * ) Notice: Subject to any disclaimer, the term of this patent is extended or adjusted under 35 U.S.C. 154(b) by 591 days.

(21) Appl. No.: 09/680,952

(22) Filed: Oct. 10, 2000

(30) Foreign Application Priority Data

Oct. 20, 1999 (JP) .......................................... 11-334777

(51) Int. Cl.⁷ ................................................ G06K 9/00
(52) U.S. Cl. .................. 382/141; 382/145; 219/121.69; 219/216
(58) Field of Search ................................ 382/141, 145; 358/1.15, 487; 219/121.69, 121.68, 216; 360/126, 133, 234.3; 216/66, 102, 23, 99

(56) References Cited

U.S. PATENT DOCUMENTS

| | | | |
|---|---|---|---|
| 5,837,963 A | | 11/1998 | Kitahara |
| 5,942,763 A | | 8/1999 | Mukogawa |
| 5,984,190 A | | 11/1999 | Nevill |
| 6,104,579 A | * | 8/2000 | Kamoshita et al. .......... 360/135 |
| 6,202,289 B1 | * | 3/2001 | Yoshimura et al. ...... 29/603.12 |
| 6,310,689 B1 | | 10/2001 | Ishikawa et al. |
| 6,532,080 B1 | * | 3/2003 | Kinjo ........................ 358/1.15 |

FOREIGN PATENT DOCUMENTS

| | | | | |
|---|---|---|---|---|
| CH | 684509 A5 | | 9/1994 | |
| EP | 0 132 520 B1 | | 2/1985 | |
| JP | 06-52138 | * | 7/1994 | ........... H01L/21/02 |
| JP | 07-141461 A | | 6/1995 | |
| JP | 08-130171 A | | 5/1996 | |
| JP | 09-050606 A | | 2/1997 | |
| JP | 10185530 A | | 7/1998 | |

* cited by examiner

Primary Examiner—Bhavesh M. Mehta
Assistant Examiner—Ali Bayat
(74) Attorney, Agent, or Firm—Oliff & Berridge, PLC

(57) ABSTRACT

Provided is a method of reading a mark and an apparatus for the same in which a mark formed on a portion other than a base in a functional device formation body such as a magnetic head slider is quickly and accurately read. A normal incident illumination light is irradiated onto a device formation surface in which an identification mark of a magnetic head slider is formed. Thus generated reflected light is imaged by a CCD camera. Thus obtained video signal has sufficiently high contrast to differentiate between the identification mark and the periphery of the identification mark. The video signal from the CCD camera is inputted to an image processing apparatus. The image processing apparatus identifies the identification mark based on the video signal and further converts the video signal into identification information.

12 Claims, 14 Drawing Sheets

METHOD OF READING MARK AND APPARATUS FOR THE SAME

BACKGROUND OF THE INVENTION

1. Field of the Invention

This invention relates to a method of reading a mark and an apparatus for the same in which a mark formed on a functional device formation body where predetermined functional devices are formed on a base is optically read.

2. Description of the Related Art

A magnetic head slider used when recording/reproducing data on/from an information recording media such as a fixed disk device is generally fabricated using a photolithography technique, a thin film formation technique, an etching technique, a polishing process technique and the like as follows: A plurality of thin film magnetic head devices is formed on a wafer and the wafer is cut so as to be separated into individual magnetic head sliders, each of which includes at least one of the thin film magnetic head device.

When manufacturing a large quantity of magnetic head sliders, an identification mark is provided on a predetermined surface of each magnetic head slider through a series of manufacturing processes. This identification mark provides, for example, manufacturing information of the magnetic head slider, such as date manufactured, manufacturing specifications, material used, manufacturing number and the like. The identification mark is provided for the purpose of managing the manufacturing history of the magnetic head slider. With mass-manufacturing, process management utilizing manufacturing information provided through the identification code makes it possible to avoid confusion of products with different manufacturing specifications and to keep track of the number of manufactured products and the whole manufacturing process accurately. When a defective part is used in a product during the manufacturing process, or when a product fails in performance or the like is found after completing the manufacturing process, a scale of occurrence of the defect is quickly and accurately detected and the defective products are effectively removed by performing a performance evaluation or the like for every identification code of a series of products manufactured.

Here, examples of the identification mark generally provided are an identification mark constituted with a string of character symbols as an arrangement of characters or numbers (called as a "character symbol" hereinafter) and an identification mark constituted with a graphical pattern as an arrangement of predetermined graphics. As to the identification mark constituted with the string of character symbols, a single character symbol or a combination of a plurality of character symbols indicates the specific manufacturing information. As to the identification mark constituted with the graphical pattern, the number, shape, size, arrangement or the like of the graphical symbols indicates the specific manufacturing information.

An example of a method of providing the identification mark on the magnetic head slider and a method of forming the identification mark is a method in Japanese Patent Laid-open No. Hei 9-50606 applied by this applicant. In this bulletin, two types of ultra-minute identification marks, where one is constituted with a string of character symbols and the other is constituted with a graphical pattern, are provided on a surface of a magnetic head slider, on the surface thin film magnetic head devices being formed, to indicate manufacturing information of the magnetic head slider. In this case, the identification code constituted with the string of character symbols is formed simultaneously with a magnetic layer as a part of the thin film magnetic head device, whereas the identification mark constituted with the graphical pattern is formed on a predetermined region on a protection film formed on the surface of the thin film magnetic head by irradiating a laser.

The ultra-minute identification mark provided on the magnetic head slider is visually identified using a microscope or the like by a worker or the like. The identification mark is just an arrangement of characters and graphics, so the identification mark is converted into corresponding manufacturing information by the worker or the like using a conversion chart. If needed, conversion may be performed more than once. In this way, the necessary identifying information is obtained from the identification mark provided on the magnetic head slider.

The above-described conventional method of reading the identification mark of the magnetic head slider has the following problems to be improved.

First, with the conventional method of reading the identification mark, onerous work such as the recognition of the ultra-minute identification mark, conversion into the manufacturing information or the like needs to be performed using manpower. Therefore, conducting the work requires a lot of time, which is a great obstacle to improvement of productivity.

Second, recognition of the ultra-minute identification mark, conversion into the manufacturing information, and the like are performed using manpower, so that there exists the risk of a mistake caused by human error such as a mistake in reading character symbols and a mistake in counting numbers of graphical symbols when recognizing the identification mark, a mistake in conversion from the identification number into the manufacturing information or the like.

In the semiconductor field, for example, as in Japanese Patent Laid-open No. Hei. 8-130171, No. Hei 7-141461 and No. Hei 6-52138, a technique to optically read the identification mark provided on each semiconductor wafer is disclosed, for example.

In these bulletins, the technique for reading the identification mark is disclosed on the assumption that the identification mark is formed on a semiconductor wafer itself, i.e., a base where semiconductor devices are formed. However, as in the aforementioned Japanese Patent Laid-open No. Hei 9-50606 applied by this applicant, a technique for reading the identification mark formed on a portion, for example, a part of the thin film magnetic head device or the protection film other than the base has not been disclosed. Further, the above three bulletins regarding a semiconductor process are described based on the premise that the identification mark is read in a wafer process and there is no description with regard to management of the identification information after the base is separated into individual members (semiconductor chip).

SUMMARY OF THE INVENTION

This invention is designed to overcome the aforementioned problems. It is an object of the invention to provide a method of reading a mark and an apparatus for the same in which even a mark formed on a portion other than a base in a functional device formation body such as a magnetic head slider can be accurately and quickly read.

According to the invention, the method of reading a mark, formed on a functional device structure layer or a protection layer in a functional device formation body including at least a base, the functional device structure layer including a predetermined functional device structure formed on the base through a thin film process and the protection layer covering the functional device structure layer, the method includes steps of irradiating an illumination light of an normal incident illumination onto the functional device formation body and reading the mark formed on the functional device structure layer or the protection layer based on a reflected light from the functional device formation body.

Here, the "functional device structure" is a device structure having a predetermined function including a magnetic, electric, optic function such as a magnetic recording/reproducing device structure, a semiconductor device structure, an optical recording/reproducing structure, or the like. Examples of the "functional device formation body" are a magnetic head slider wherein a magnetic recording device or a magnetic reproducing device are formed, a semiconductor chip wherein a semiconductor device is formed, an optical pickup wherein an optical recording/reproducing device is formed or the like. The "mark" denotes an object of perception used to show certain things. Examples of the "mark" are not only symbols but also languages or letters. The "perfect incident illumination" is an illumination method employing an optical system similar to a telecentric optical system (not a perfect telecentric optical system). Specifically, with this illumination method an illumination light vertically comes onto a surface to be irradiated and the reflected light becomes parallel to the light axis not only on the light axis but outside of the light axis as well. Similarly, at any point between the condenser lens behind the iris of telecentric and the surface of an image, the reflected light becomes parallel to the light axis on the light axis as well as outside of the light axis.

With the method of reading a mark of the present invention, the mark can be formed to include the manufacturing information which is referred to in the manufacturing process of the functional device formation body. In this case, preferably the mark includes origin identifying information which shows the origin of the base included in the functional device formation body. Here, the "origin identifying information" is information showing the origin of the base in the manufacturing process. For instance, when the base is separated from a predetermined mother material, the origin identifying information includes information specifying the mother material, manufacturing lot information of the mother material, and information of the position where the base is located in the mother material or the like.

With the method of reading a mark of the invention, the mark can include at least a dot pattern constituted with a plurality of dots and a character symbol. In this case, preferably the dot pattern is formed of a residue of material melted on the protection layer by an irradiation of a predetermined energy beam. The dot pattern may be an irradiation scar caused by deterioration of a part of the protection layer by the irradiation of the energy beam. In these cases, preferably the mark includes the origin identifying information to represent the origin of the base included in the functional device formation body as described.

With the method of reading a mark of the invention, the character symbol is formed simultaneously with a predetermined layer which is a part of the functional device structure layer. In this case, the character symbol includes address information representing an address of the base in the parent material from which the base included in the functional device formation body has been separated.

With the method of reading a mark of the invention, preferably the step for reading the mark includes a process for generating an image data by photoelectrically converting a reflected light from the functional device formation body, a process for obtaining an image pattern by performing image recognition based on the formed image data and a process for obtaining information corresponding to the image pattern based on the obtained image pattern.

With the method of reading a mark of the invention, the functional device structure can be a thin film magnetic head structure for performing at least one of recording and reproducing information to/from a recording medium.

According to the invention, the apparatus for reading a mark, included in a functional device formation body including at least a base, a functional device structure layer having a predetermined functional device structure formed on the base through a thin film process, a protection layer covering the functional device structure layer and the predetermined mark formed on the functional device structure layer or the protection layer, are provided with a light source for irradiating a light, a normal incident illumination system for making it possible to irradiate an illumination light of a normal incident illumination onto the functional device formation body, and means of reading the mark formed on the functional device structure layer or the protection layer based on a reflected light from the functional device formation body.

With the method of reading a mark and the apparatus for the same, the illumination light of the normal incident illumination is irradiated onto the functional device formation body and the mark formed on the functional device structure layer or the protection layer is read based on the reflected light from the functional device formation body.

Other and further objects, features and advantages of the invention will appear more fully from the following description.

DETAILED DESCRIPTION OF THE PREFERRED EMBODIMENT

An embodiment of the invention will be described in detail below with reference to the accompanying drawings. In the embodiment, the structure of a magnetic head slider in which a method of reading a mark according to the embodiment of the invention is employed and a manufacturing process thereof, and a method of providing a mark on the magnetic head slider will be described followed by the method of reading a mark and an apparatus for the same according to the embodiment of the present invention.

[Structure of a Magnetic Head Slider]

Figure 1:
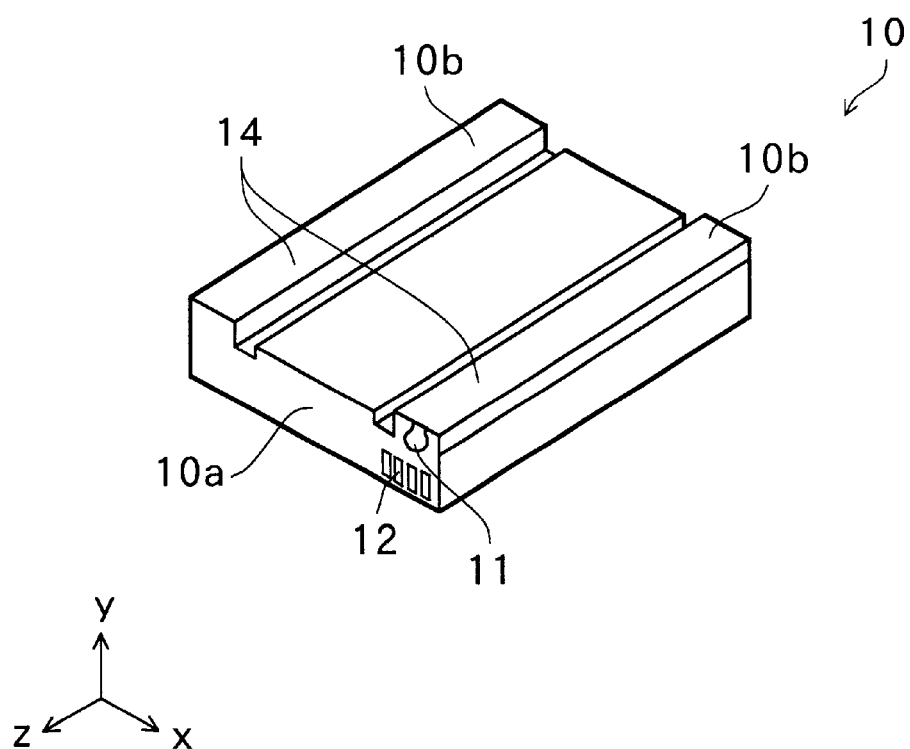
FIG. 1 is a perspective view showing the external structure of a magnetic head slider in which a method of reading a mark or an apparatus for the same is employed according to an embodiment of the present invention.
Figure 2:
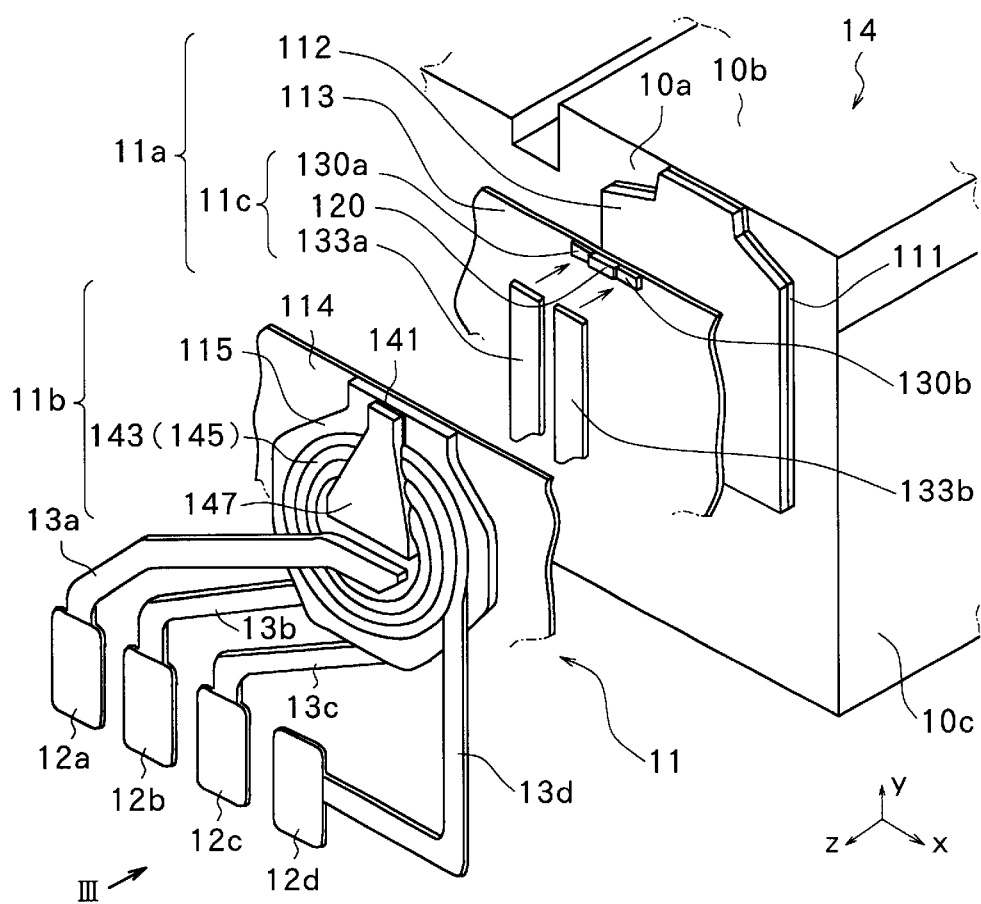
FIG. 2 is an enlarged perspective view of a main portion of the disassembled magnetic head slider shown in FIG. 1.
Figure 3:
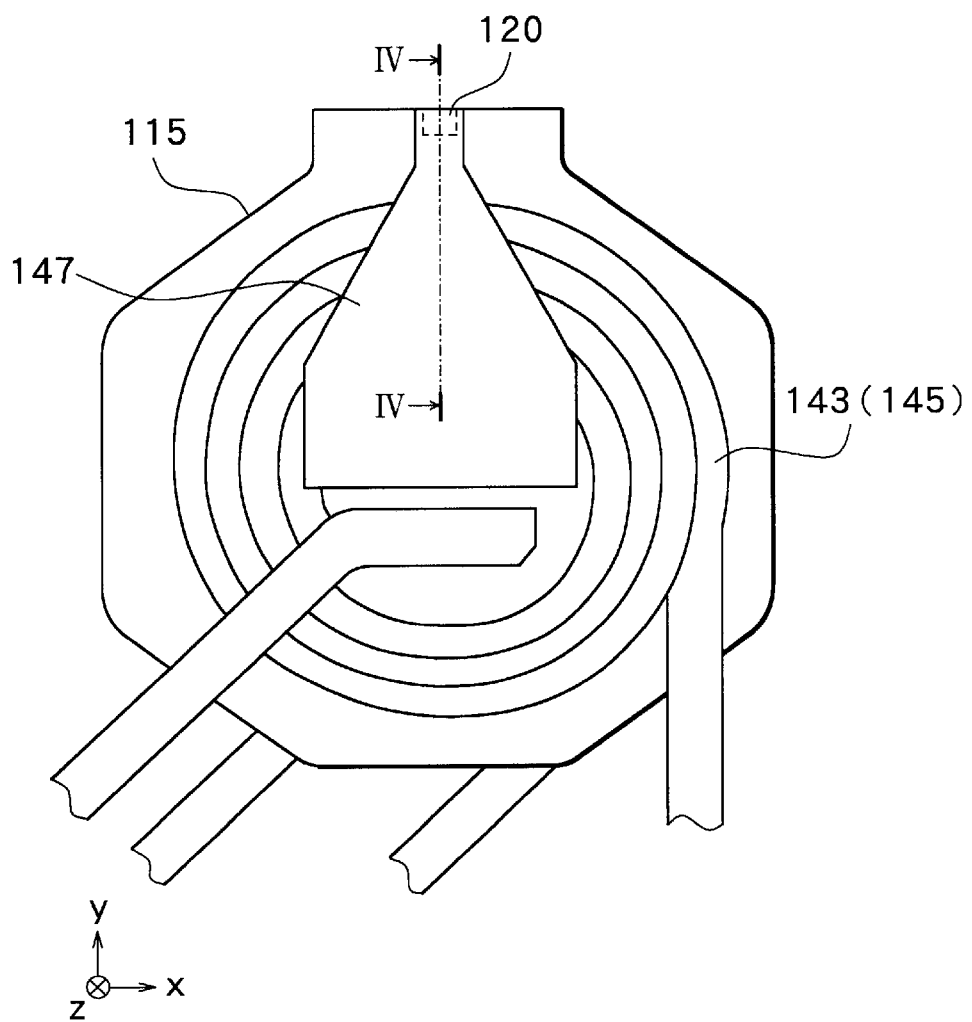
FIG. 3 is a plan view of the structure of the thin film magnetic head formed in the magnetic head slider shown in FIG. 1.
Figure 4:
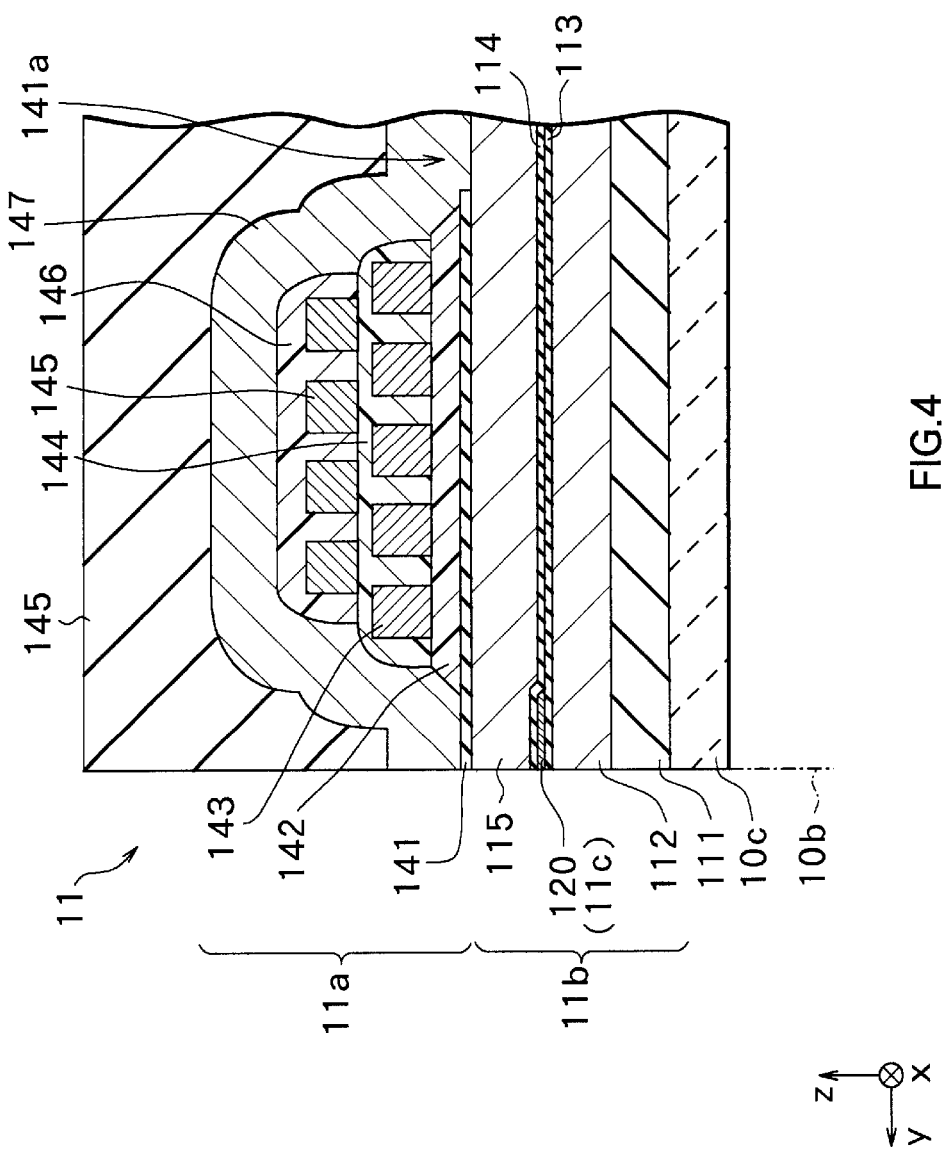
FIG. 4 is a sectional view of the principal structure of the thin film magnetic head formed in the magnetic head slider shown in FIG. 1.

FIGS. 1 through 4 show the configuration of the magnetic head slider in which the method of reading a mark according to the embodiment of the invention is employed. FIG. 1 is an external view of the structure of the magnetic head slider; FIG. 2 is an exploded view of the structure of a thin film magnetic head device 11; FIG. 3 is a plane view of the structure viewed from the direction of the arrow III of FIG. 2; and FIG. 4 is a sectional view of the structure taken along the IV—IV line of FIG. 3.

As described in these drawings, the magnetic head slider 10 has a block-shaped base 10c made of $Al_2O_3$—TiC (altic), for example. The base 10c is substantially hexahedral (i.e., rectangular parallelepiped), for instance. One face of the hexahedron (an upper face in FIG. 1) closely faces the recording surface of the magnetic recording medium. Two parallel slider rails 14 are formed on a surface facing the recording surface of the magnetic recording medium. The surface of each slider rail 14 is called an air bearing surface (ABS) 10b. When the magnetic recording medium rotates, airflow generated between the recording surface of the magnetic recording medium and the air bearing surface 10b allows the magnetic head slider 10 to slightly move away from the recording surface. Thus, a constant clearance is created between the air bearing surface 10b and the magnetic recording medium. Here, the magnetic head slider 10 corresponds to one specific example of the "functional device formation body" of the present invention, whereas the base 10c corresponds to one specific example of the "base" of the invention.

One lateral side (the left lateral side in FIG. 1) orthogonal to the air bearing surface 10b of the base 10c comprises a device formation surface 10a. Within the device formation surface 10a formed in an area corresponding to the slider rail 14 and the vicinity thereof are a thin film magnetic head device 11, pole pads 12a through 12d which input/output recording/reproducing signals to/from the thin film magnetic head device 11, wiring patterns 13a through 13d for electrically connecting the thin film magnetic head device 11 and the pole pads 12a through 12d.

As shown in FIGS. 2 through 4, the thin film magnetic head device 11 is an integrated type magnetic recording/reproducing head having an integral structure comprising a reproducing head 11a for reproducing magnetic information recorded on the magnetic recording medium and a recording head 11b for recording magnetic information on the magnetic recording medium.

The reproducing head 11a has a stacked structure comprising an insulating layer 111, a bottom shield layer 112, a bottom shield gap layer 113, a top shield gap layer 114 and a top shield layer 115, which are stacked in this order on the base 10c on the side close to the air bearing surface 10b, for example. For example, the insulating layer 111 is $2\,\mu m$ to $10\,\mu m$ in thickness along the direction of stack (hereinafter referred to as a thickness) and is made of $Al_2O_3$ (alumina). For example, the bottom shield layer 112 is $1\,\mu m$ to $3\,\mu m$ in thickness and is made of a magnetic material such as NiFe (nickel-iron alloy: permalloy). For example, the bottom shield gap layer 113 and the top shield gap layer 114 are each 10 nm to 100 nm in thickness and are made of $Al_2O_3$ or AlN (aluminum nitride). For example, the top shield layer 115 is $1\,\mu m$ to $4\,\mu m$ in thickness and is made of a magnetic material such as NiFe. The top shield layer 115 also functions as a bottom pole of the recording head 11b.

An MR (magnetoresistive) element 11c is buried between the bottom shield gap layer 113 and the top shield gap layer 114. The MR element 11c is an element for reading information written on a magnetic recording medium (not shown) and is located on the side close to the air bearing surface 10b. The MR element 11c includes an MR film 120 made of an AMR (anisotropic magnetoresistive) film or a GMR (giant magnetoresistive) film. The AMR film has a single-layer structure including a magnetic layer made of NiFe, for example. The GMR film has a multilayered structure including, in addition to a soft magnetic layer, a ferromagnetic layer made of, for example, CoFe (iron-cobalt alloy), an antiferromagnetic layer made of, for example, MnPt (manganese-platinum alloy), a nonmagnetic metal layer made of, for example, Cu (copper), and so on.

Magnetic domain control films 130a and 130b made of, for example, a hard magnetic material are formed on both sides of the MR film 120 along the direction of a track width (X direction in FIG. 2). The magnetic domain control films 130a and 130b are films for applying a bias magnetic field to the MR film 120 in a fixed direction and thereby preventing Barkhausen noise. A pair of lead layers 133a and 133b facing each other with the MR film 120 in between in the direction of the track width is electrically connected to the MR film 120. Similarly to the MR film 120, the lead layers 133a and 133b are formed between the bottom shield gap layer 113 and the top shield gap layer 114. The lead layers 133a and 133b are made of metal such as tantalum (Ta).

The lead layers 133a and 133b extend in the direction opposite to the air bearing surface 10b. The lead layers 133a and 133b are electrically connected to output terminals 133c and 133d, which are formed into a predetermined pattern on the top shield gap layer 114, through an opening (not shown) formed in the top shield gap layer 114.

For example, as shown in FIGS. 2 to 4, the recording head 11b has a write gap layer 141 of $0.1\,\mu m$ to $0.5\,\mu m$ thick made of an insulating film such as $Al_2O_3$ on the top shield layer 115. The write gap layer 141 has an opening 141a at the position corresponding to the center of thin film coils 143 and 145 to be described later. The thin film coils 143 of 1 μm to 3 μm thick and a photoresist layer 144 for coating the thin film coils 143 are formed on the write gap layer 141 with a photoresist layer 142 having a thickness of 1.0 μm to 5.0 μm for determining a throat height in between. The thin film coils 145 of 1 μm to 3 μm thick and a photoresist layer 146 for coating the thin film coils 145 are formed on the photoresist layer 144. In the embodiment, the description is given with regard to an example in which two thin film coil layers are stacked. However, the number of thin film coil layers may be one, or three or more.

A top pole 147 of about 3 μm thick made of a magnetic material having high saturation magnetic flux density, such as NiFe or FeN (iron nitride), is formed on the write gap layer 141 and the photoresist layers 142, 144 and 146. The top pole 147 is in contact with and magnetically coupled to the top shield layer 115 through the opening 141a of the write gap layer 141 located at the position corresponding to the center of the thin film coils 143 and 145. An overcoat layer 148 of 20 μm to 30 μm in thickness made of $Al_2O_3$ is formed on the top pole 147 covering the whole underneath, for example.

The thin film magnetic head device 11 having the above-described structure functions in the following manner. When a current is applied to the thin film coils 143 and 145 of the recording head 11b during writing, a magnetic flux occurs in both the top shield layer 115 as a bottom pole and the top pole 147 due to this current and a signal magnetic field for writing occurs in the vicinity of the recording gap layer 141. This signal magnetic field magnetizes a part of the magnetic recording medium, thus information is recorded thereon. On the other hand, a sense current is applied to the MR film 120 of the reproducing head 11a during reproduction. Since resistance of the MR film 120 changes in accordance with the reproducing signal magnetic field from the magnetic recording medium, information recorded on the magnetic recording medium is read by sensing a change in resistance based on a change in the sense current.

[The Manufacturing Process of the Magnetic Head Slider]

Figure 5:
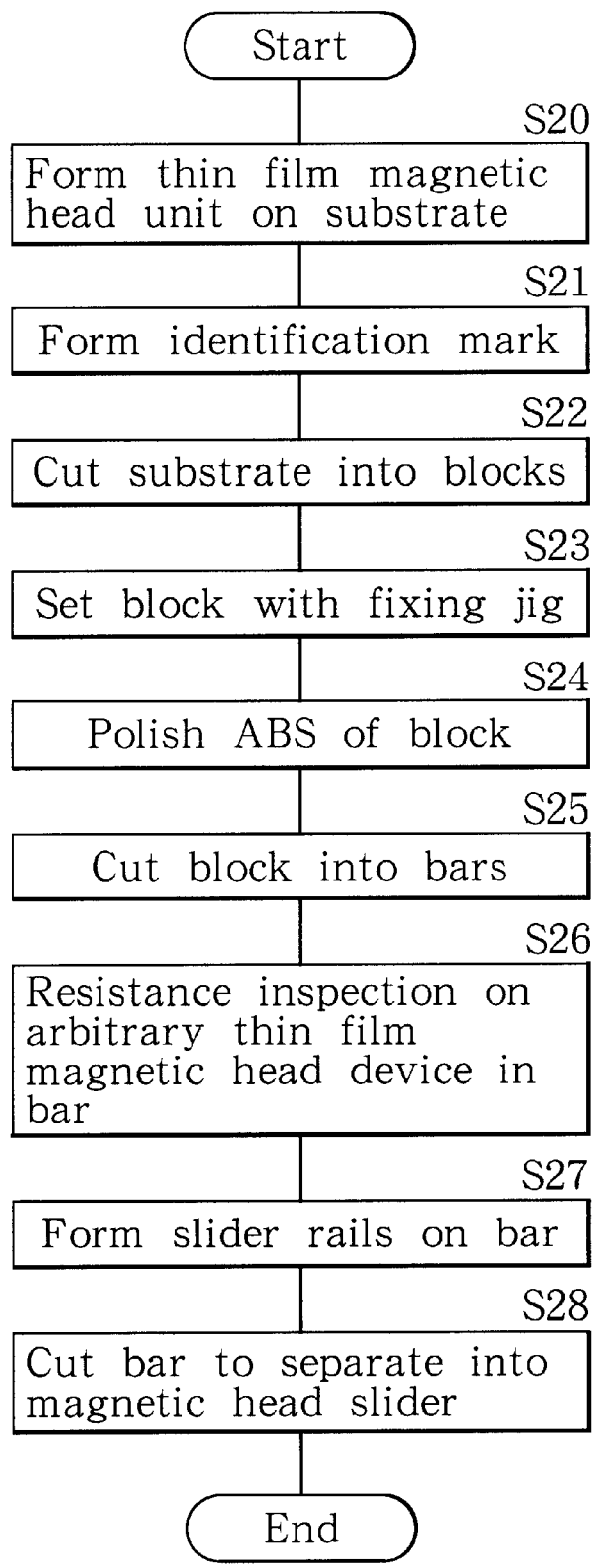
FIG. 5 is a flow chart of a method of manufacturing a magnetic head slider shown in FIG. 1.

The magnetic head slider 10 shown in FIG. 1 is formed through manufacturing steps shown in FIGS. 5 through 10, for example. FIG. 5 shows the whole manufacturing process of the magnetic head slider 10 shown in FIG. 1 and FIGS. 6 through 11 concretely show the main steps of the manufacturing process shown in FIG. 5. Each step is described along the flow chart of FIG. 5 herein later.

Figure 6:
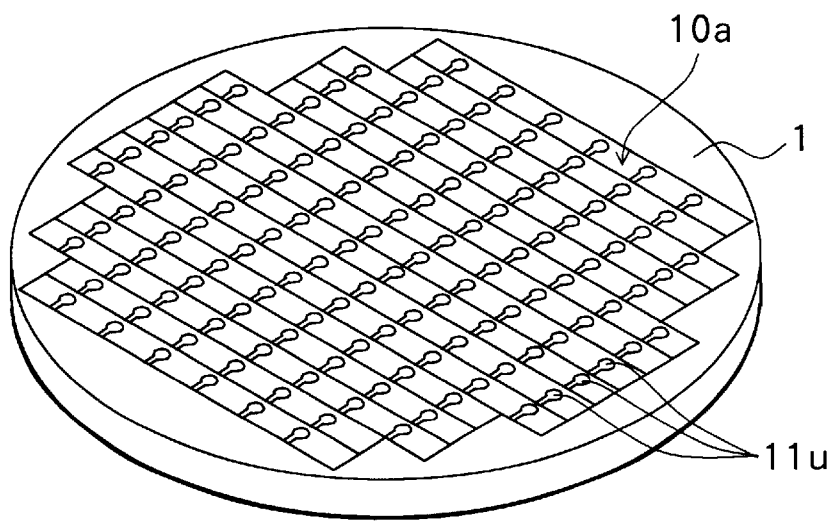
FIG. 6 is a perspective view of a step of manufacturing the magnetic head slider.

(1) First of all, as shown in FIG. 6, a plurality of magnetic head unit 11u is formed so as to be regularly arranged on a base, which will become the base 10c of the magnetic head slider 10, for example (Step S20). The magnetic head unit 11u comprises one piece of the thin film magnetic head device 11, a set of the pole pads 11a through 12d, and a set of wiring patterns 13a through 13d. In the step for forming the MR film 120, which is included in the step for forming the magnetic head unit 11u, an identification mark 14a constituted with a string of character symbols is formed in each region, where each magnetic head unit 11u is formed, using the same material as the MR film 120. Here, the MR film 120 corresponds to a specific example of "a predetermined layer comprising a part of the functional device structure layer" of the present invention.

Figure 12:
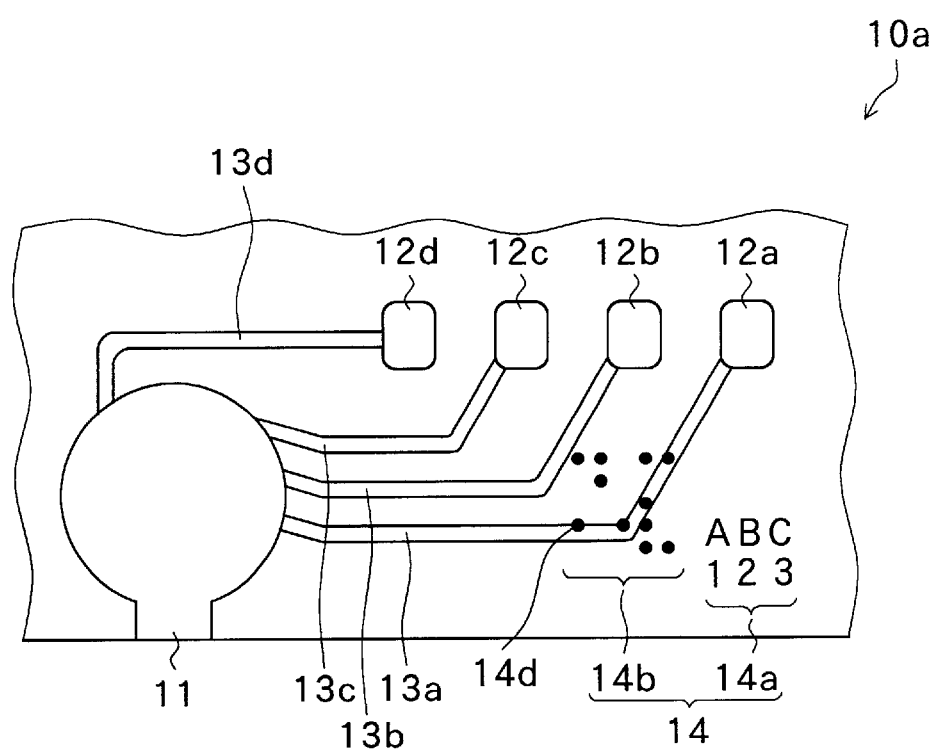
FIG. 12 shows one example of an identification mark formed on the magnetic head slider shown in FIG. 1.

(2) Next, as shown in FIG. 12 to be described later, for example, an identification mark 14b constituted with a dot pattern is formed in each region where each magnetic head unit 11u is formed by irradiation of a laser beam (Step 1). Here, the laser beam corresponds to a specific example of "an energy beam" of the present invention.

Figure 7:
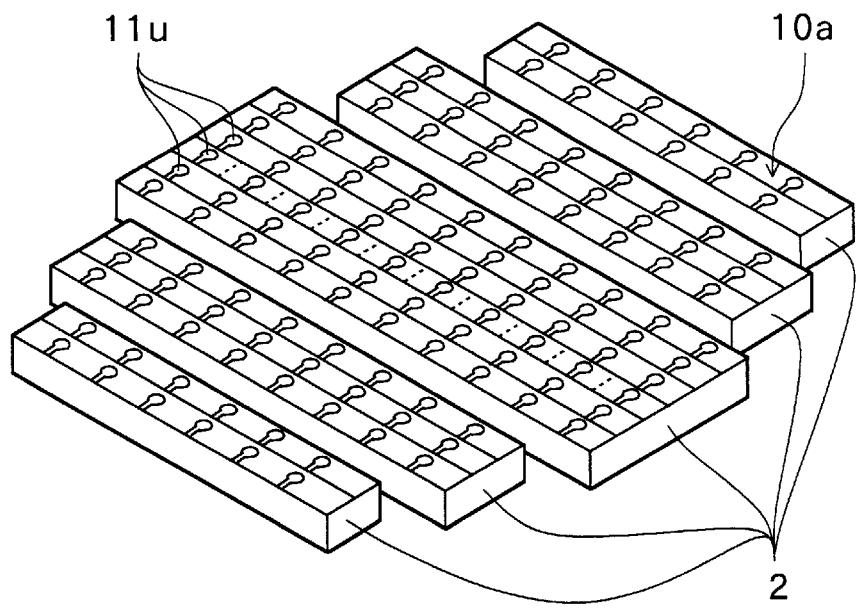
FIG. 7 is a perspective view of a step following the step of FIG. 6.

(3) Next, as shown in FIG. 7, the base 1 where a plurality of magnetic head units 11u is formed is cut to be separated into magnetic head blocks 2 including the plurality of magnetic head units 11u (Step S22). At this time, as shown in FIG. 7, by separating the base 1 into the magnetic head blocks 2 having different lengths, all the magnetic head units 11u formed on the base 11 are included in the separated magnetic head blocks 2.

Figure 8:
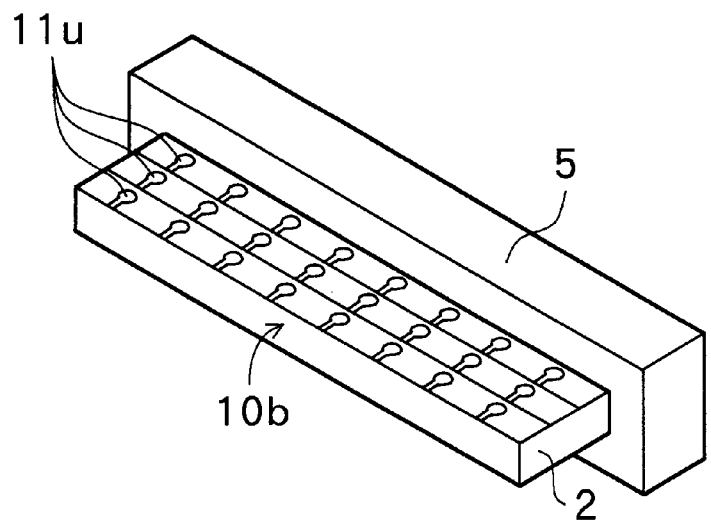
FIG. 8 is a perspective view of a step following the step of FIG. 7.

(4) Next, as shown in FIG. 8, one end surface (sectional surface) of the arbitrary magnetic head block 2 is fixed by using a fixing jig 5 intended for this purpose (Step S23) and the other end surface of the magnetic head block 2 is polished by a grinder or the like, whereby the ABS 10b is formed (Step 24).

Figure 9:
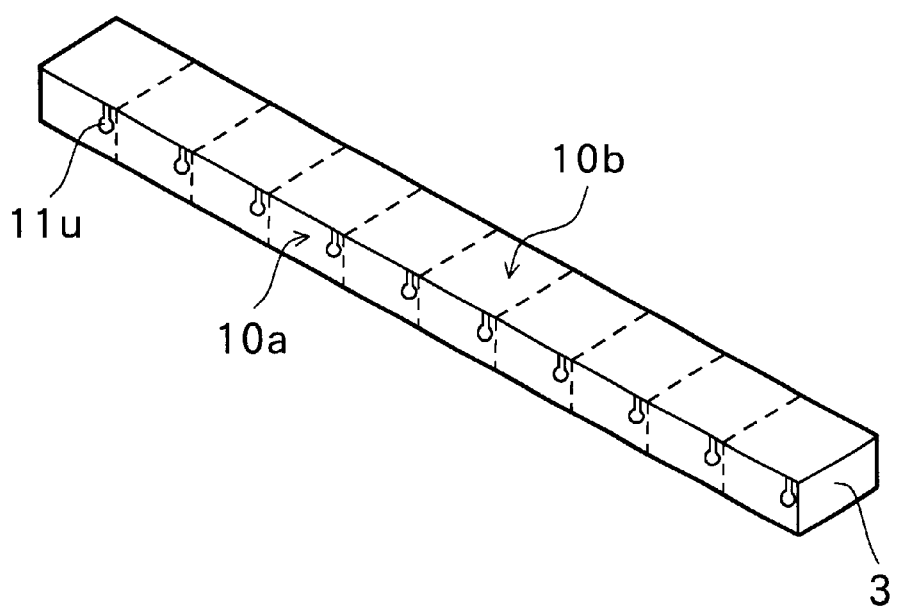
FIG. 9 is a perspective view of a step following the step of FIG. 8.

(5) Next, as shown in FIG. 9, the magnetic head blocks 2 are cut to be separated into a plurality of magnetic head bars 3 (Step S25).

(6) Next, characteristics of the thin film magnetic head device 11 are measured (Step S26). This characteristic measurement is one of the performance evaluations with regard to the thin film magnetic head device 11. The measurement result of the arbitrary thin film magnetic head device 11 is regarded as a typical value of the characteristics of all the thin film magnetic head devices 11 in the magnetic head block 2. A set of the thin film magnetic head devices in the magnetic head block 2 is judged as to whether the desired performance is fulfilled or not.

Figure 10:
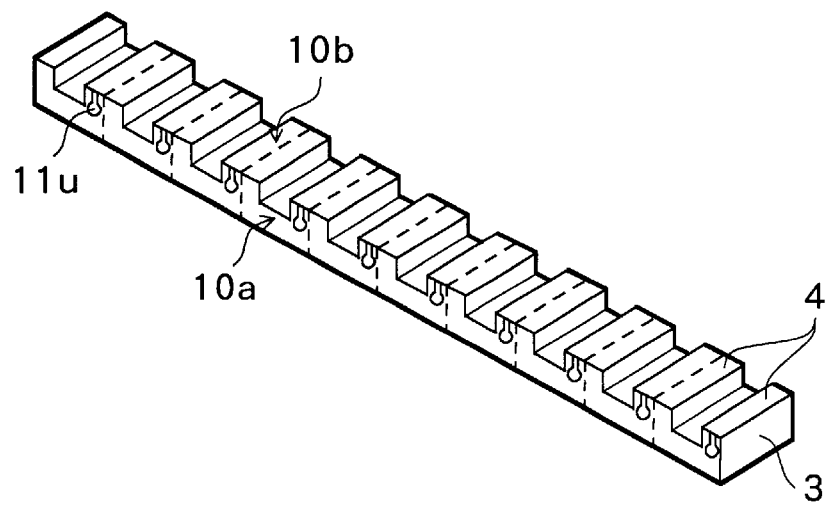
FIG. 10 is a perspective view of a step following the step of FIG. 9.

(7) Next, after a photoresist layer (not shown) is formed on the ABS 10b of the magnetic head bar 3, the photoresist layer is patterned into a predetermined shape through a photolithography process using a photo mask (not shown). Thereafter, the ABS 10b of the magnetic head bar 3 is etched using the patterned photoresist layer as a mask, whereby the slider rails 14 are formed as shown in FIG. 10 (Step 27).

Figure 11:
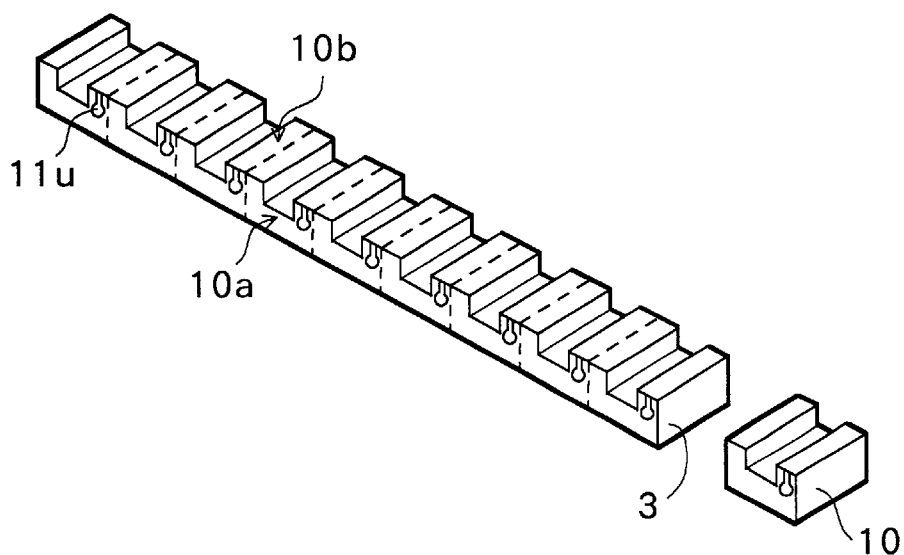
FIG. 11 is a perspective view of a step following the step of FIG. 10.

(8) Finally, as shown in FIG. 11, the magnetic head bar 3 where the slider rails 14 are formed are cut, thereby completing the magnetic head sliders 10 shown in FIG. 1 (Step S28). Steps S23 through S28 are repeatedly performed on the plurality of magnetic head blocks 2 which is separated in Step S22.

[Structure of the Identification Mark and the Method of Manufacturing the Same]

With the magnetic head slider 10 formed through the above-described steps, an identification mark 14 as shown in FIG. 12 is provided, for example. FIG. 12 is an enlarged view of a part of the device formation surface 10a of the magnetic head slider 10 shown in FIG. 1. As shown in FIG. 12, the identification mark 14 includes, for example, the identification mark 14a and the identification mark 14b. The identification mark 14a comprises a string of character symbols which is constituted with a plurality of letters and numerals, whereas the identification mark 14b comprises a graphical pattern constituted with an arrangement of a plurality of graphical symbols (a dot shape in the embodiment).

The identification mark 14a is constituted by arranging a plurality of ultra-minute letters and numerals such as "ABC123". The identification mark 14a includes manufacturing information to specify the address of the arbitrary magnetic head slider 10 on the base 1 before being separated, for example. In FIG. 12, the identification mark 14a is formed, for example, on the device formation face 10a in a neighboring region not including the region where the magnetic head unit 11u is formed.

The specific method of forming the identification mark 14a is as follows, for example: A photo mask having a pattern corresponding to the MR film 120 and a pattern corresponding to the shape of the identification mark 14a is prepared. This photo mask is used for a photolithography process in a step forming the MR film comprising a part of the thin film magnetic head device 11. After coating a photoresist layer (not shown), the photolithography process is performed using the photomask, and then the photoresist layer is patterned in a desired shape. Subsequently, a plating process takes place in the patterned region in the photoresist layer. Thus, the identification mark 14a is formed simultaneously with the MR film 120.

The identification mark 14a is an ultra-minute convex structure formed with the same material (e.g., permalloy), as that used for the MR film 120. The size of individual character symbols comprising the identification mark 14a is, for example, about 20 μm×30 μm, and the width thereof is approximately several tens of nm. Depending on the size of the magnetic head unit 11u and the identification mark 14a, the maximum number of character symbols for the identification marks 14a is approximately ten, for example.

When the identification mark 14a specifies the address of the arbitrary magnetic head slider 10 on the base 1 before being separated, only one type of photomask needs to be prepared for one type of base with regard to the photomask used in the formation process of the MR film 120 and the identification mark 14a. This is because with this case, the identification mark 14a is unique to and corresponds with the address of the magnetic head slider 10 on the base 1.

On the other hand, the identification mark 14b comprises a dot pattern constituted with assembly of a plurality of ultra-minute dots 14d, for example. The identification mark 14b includes, for example, manufacturing information to specify the base 1 which is used when fabricating the magnetic head slider 10. The identification mark 14b includes a base number peculiar to the base 1, a manufacturing lot number indicating the manufacturing lot of the base or the like, for example. The identification mark 14b is formed on the overcoat layer 148 (shown in FIG. 4) which is formed in the region not including the pole pad 12, for example. The overcoat layer 148 is not illustrated in the FIG. 12. Here, the overcoat layer 148 corresponds to one specific example of the "protection film" in the present invention.

A dot 14d comprising the identification mark 14b is a convex structure as will be described later. The convex structure of identification mark 14b is formed as follows: In the process of forming a pole covering film (not shown in FIG. 12) on the pole pad 12, a laser is irradiated on a part of a metal layer which is formed on the overcoat layer 148. At this time, a part of the metal layer melted by the irradiation of the laser remains on the overcoat layer 148 as a residue, thereby forming the convex structure. With this case, the metal layer is formed on the overcoat layer 148 serving as a seed layer by stacking titanium, gold or the like, for example when the pole covering film is formed on a surface of the pole pad 12 using a plating method. Since the identification mark 14b is formed on the overcoat layer 148 as described above, the identification mark 14b may be formed so as to overlap with connection wiring patterns 13a through 13d.

Figure 13:
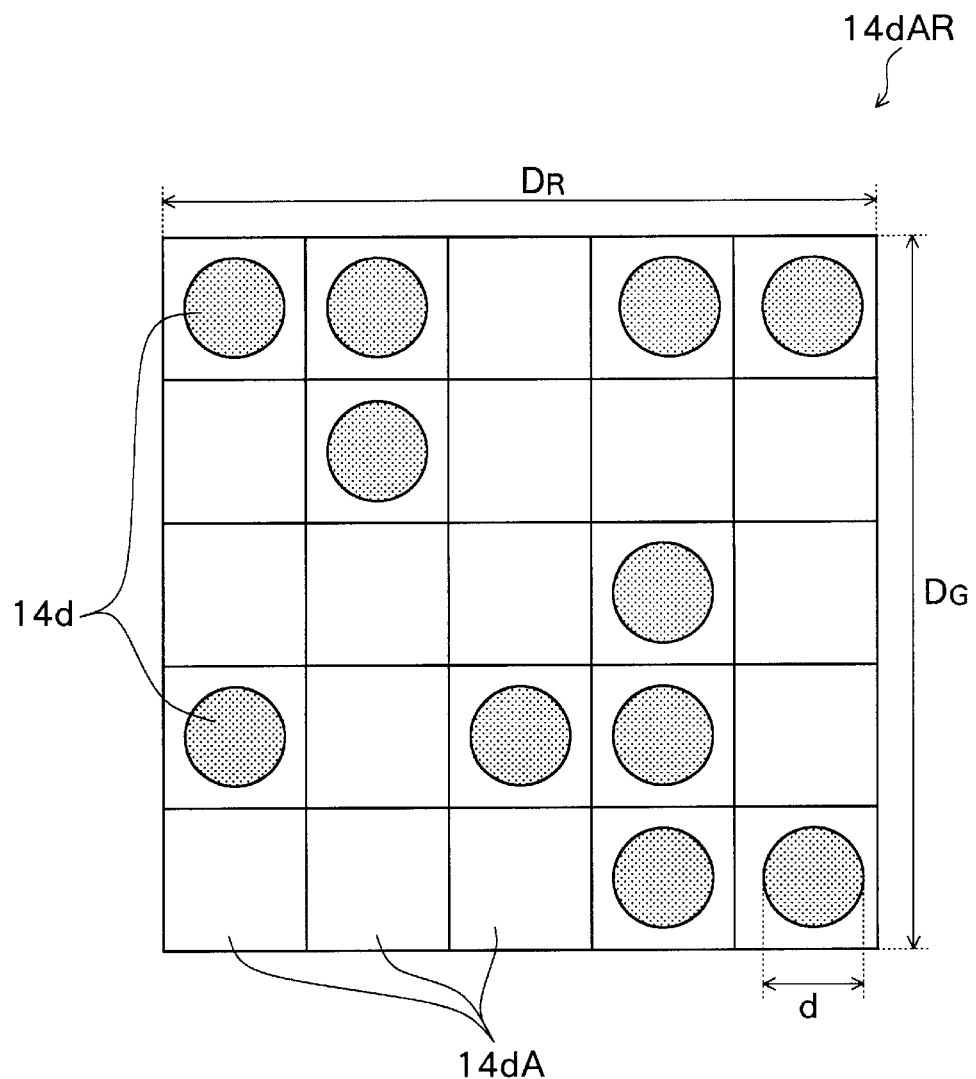
FIG. 13 is a plan view showing an enlarged identification mark constituted with a dot pattern of the identification mark shown in FIG. 12.

FIG. 13 is an enlarged view of the dot pattern comprising the identification mark 14b. As shown in the drawing, each dot 14d comprising the dot pattern is arranged in a predetermined dot arrangement block 14dA within a dot arrangement region 14dAR of 5 columns (in a vertical direction)×5 rows (in a lateral direction), for example. The dimension d of each dot 14d is about from 13 μm to 16 μm, for example. Both of the dimension $D_G$ of the dot arrangement region 14dAR in a column direction (vertical direction) and the dimension $D_R$ in a row direction (lateral direction) are about 80 μm.

As shown in FIG. 13, the identification mark 14b is constituted with the dots 14d, which represents a binary code by arranging the dot 14d in an arbitrary dot arrangement block 14dA (for example, "1") or not (for example, "0"). By constituting the identification mark 14b with a dot pattern consisting of the arrangement of a plurality of the ultra-minute dots 14d displayed with the binary mark display, more information can be displayed in a smaller region as compared to the case where the identification mark 14b is displayed with character symbols. Further, formation of the dots 14d by irradiating a laser enables the identification mark 14b to be formed quickly and easily. Further, after completing the thin film formation process, the identification mark 14b is formed, thereby avoiding a complicated manufacturing process.

Figure 14:
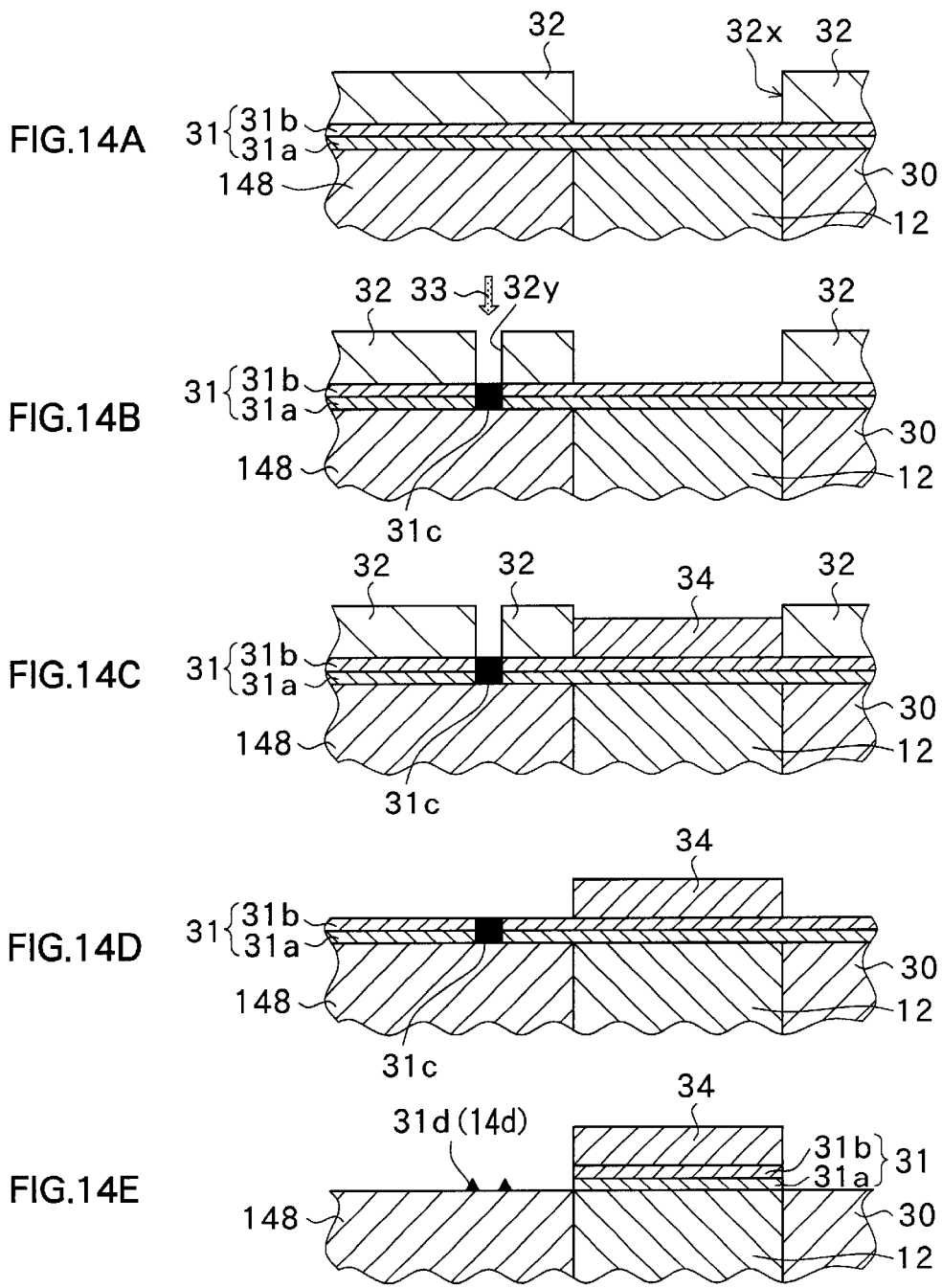
FIG. 14 is a sectional view of the thin film magnetic head explaining a method of forming the identification number constituted with the dot pattern shown in FIG. 13.

Next, the specific method of forming the dots 14d constituting the identification mark 14b as shown in FIG. 3 will be described with reference to FIG. 14. FIGS. 14A through 14E show the enlarged sectional structure of a neighboring portion of the region where the pole pad 12 (the representative of the pole pads 12a through 12d) is provided in the thin film magnetic head device 11, explaining each step of forming the identification mark 14b. In FIG. 14A, steps after formation of the pole pad 12, and the overcoat layer 48 on the whole surface of the periphery of the pole pad 12 are shown.

(1) In the step for forming the identification mark 14b, as shown in FIG. 14A, the surface of the overcoat layer 148 formed on the whole surface of the pole pad 12 and the periphery thereof is polished so as to expose the surface of the pole pad 12 by a CMP method or the like, thereby flattening the whole surface.

(2) An adhesive layer 31a and a seed layer 31b having small width over the whole surface (These two layers are simply collectively referred to as a metal layer 31 herein after.) are sequentially deposited by a sputtering method, for example. The adhesive layer 31a is made of titanium having a function to improve adhesiveness between the pole pad 12 and the seed layer 31b, for example. The seed layer 31b is made of gold, functioning as an underlying layer when a pole covering film 34 is formed using a plating method in the later step, for example. Preferably, the thickness of the adhesive layer 31a is about 50 Å, whereas the thickness of the seed layer 31b is about 500 Å for example. The adhesive layer 31a may be made of chromium or tantalum instead of titanium, while the seed layer 31b may be made of platinum instead of gold.

(3) Next, a photoresist layer 32 is formed on the whole surface of the metal layer 31. Subsequently, photolithography (exposure and development process) takes place using a mask (not shown) having a pattern corresponding to the plane shape of the pole pad 12, thereby patterning the photoresist layer 32. Thus, an pole covering film pattern aperture 32x is formed in the region corresponding to the region where the pole pad 12 is provided in the photoresist layer 32.

(4) Next, as shown in FIG. 14B, a beam 33 from an yttrium aluminum gallium (YAG) laser (referred to as a laser beam herein after) is irradiated on a predetermined region (a region intended for formation of dots) in the photoresist 32, for example. By the irradiation of the laser beam 33, a dot patterned aperture 32y is formed in the irradiated region in the photoresist layer 32. At this time, a part of the irradiated region 31c (the bottom region of the dot patterned aperture 32y) in the metal layer 31 melts simultaneously. Other energy beams such as an ordinal light (not a coherent light) other than the laser beam, an electron beam, an ion beam or the like may be used in stead of the laser beam.

(5) Next, as shown in FIG. 14C, the pole covering film 34 is formed on the seed layer 31b within the pole covering film pattern aperture 32x using a plating method, for example.

(6) Next, as shown in FIG. 14D, the photoresist layer 32 is removed. After that, the metal layer 31 on the overcoat layer 148 is removed with an ion milling or the like as shown in FIG. 14E. Thus, dots 14d comprising residues 13d of the melted metal are formed on the region irradiated by the laser on the surface of the overcoat layer 148, as shown in FIG. 14E.

The method of forming the dot 14d is not limited to the aforementioned method. For example, the laser beam 33 is directly irradiated on the overcoat layer 148 so as to deform a part of the overcoat layer 148. Thus generated laser-scars may comprise the dots 14d.

[Structure of Identification Mark Reading Apparatus 60]

Next, an identification mark reading apparatus according to the embodiment of the present invention will be described in detail with reference to FIG. 15.

Figure 15:
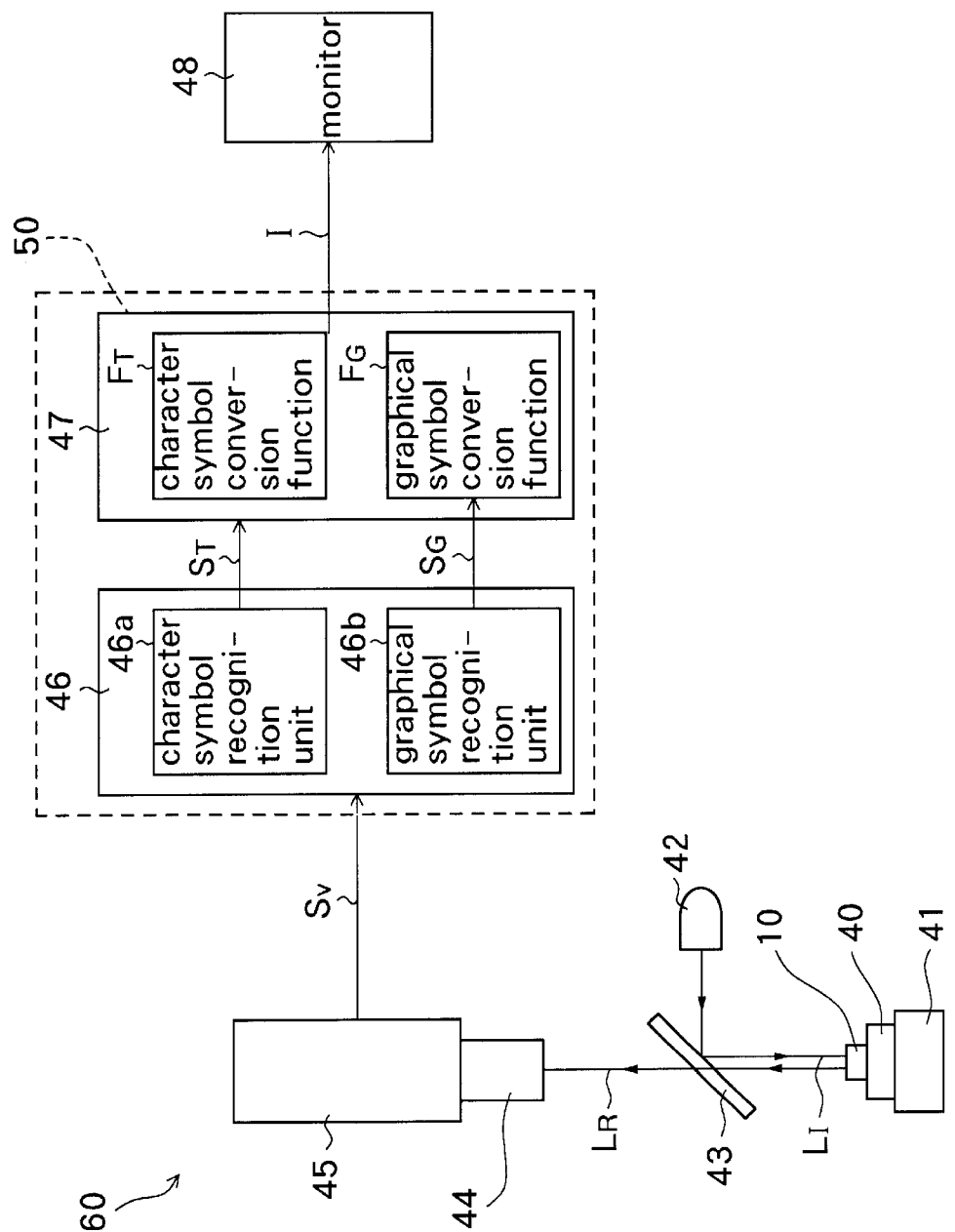
FIG. 15 is a block diagram showing a configuration of the apparatus for reading a mark according to the embodiment of the present invention.

FIG. 15 is a diagram showing the identification mark reading apparatus 60 according to the embodiment. As shown in the drawing, the identification mark reading apparatus 60 includes, a sample stage 40 for setting the magnetic head slider 10, a stage position control unit 41 for controlling the position of the sample stage 40, a light source 42 for supplying a light $L_I$, a half mirror 43 for reflecting the light $L_I$ from the light source 42 and directing it to the magnetic head slider 10, an image formation optical system 44 for forming an optical image of the reflected light $L_R$ from the magnetic head slider 10, a charge-coupled device (CCD) camera 45 for picking up the optical image formed by the image formation optical system 44 and converting it into an electrical video signal, an image processing unit 50 for performing a predetermined image processing on the video signal from the CCD camera 45, recognizing the identification mark 14 and converting the identification mark 14 into manufacturing information, and a monitor 46 for displaying the manufacturing information obtained by the image processing unit 50. Each unit described above is controlled by a control unit (not shown). Here, the light source 42, the half mirror 43 and the image formation optical system 44 correspond to one specific example of "optical system realizing normal incident illumination" of the present invention, and the CCD camera 45 and the image processing unit 50 correspond to one specific example of "means for reading" of the present invention.

The pedestal position control unit 41 moves the sample fixing pedestal 40 in a horizontal direction and vertical direction to the optical axis of the illumination light $L_I$ (or $L_R$), so that the position of the identification mark 14a and the identification mark 14b of the magnetic head slider 10 is within the range where the CCD camera can pick up an image.

The image formation optical system 44, which is provided with an object lens, a collimator lens or the like (not shown), forms an optical image of the identification mark 14. By the action of the image formation optical system 44, the ultra-minute identification mark 14 is scaled up in a predetermined scaling factor and formed as an image.

The CCD camera 45 picks up the optical image of the reflected light $L_R$ and converts the optical image into the electrical video signal $S_V$.

The image processing unit 50 identifies the identification mark 14 based on the video signal $S_V$ inputted from the CCD camera 45 and converts it into corresponding manufacturing information. The image processing unit 50 includes a video signal recognition unit 46 and a conversion unit 47. The video signal recognition unit 46 includes a character symbol recognition unit 46a and a graphical symbol recognition unit 46b. Among video signals Sv inputted from the CCD camera 45, images related to the identification mark 14a are captured by the character symbol recognition unit 46a and images related to the identification mark 14b are captured by the character symbol recognition unit 46b. The character symbol recognition unit 46a draws a string of character symbols constituting the identification mark 14a by performing a predetermined pattern identifying process on the captured image and inputs character symbol signal $S_T$ to the conversion unit 47. On the other hand, the graphical symbol recognition unit 46b draws the graphical pattern constituting the identification mark 14b by performing a predetermined pattern identifying process on the captured image and inputs a graphical recognition signal $S_G$ to the conversion unit 47. The specific image processing process in the character symbol recognition unit 46a and the graphical symbol recognition unit 46b will be described later.

The conversion unit 47 already includes a character symbol conversion function $F_T$ and a graphical symbol conversion function $F_G$ in memory (not shown). When the character recognition signal $S_T$ is inputted from the video signal recognition unit 46, the conversion unit 47 converts the character recognition signal $S_T$ into corresponding manufacturing information $I_T$ using the character symbol conversion function $F_T$. When a graphical recognition signal $S_G$ is inputted from the video signal recognition unit 46, the conversion unit 47 converts the graphical recognition signal $S_G$ into corresponding manufacturing information $I_G$ using the graphical symbol conversion function $F_G$. The conversion unit 47 outputs the converted information I ($I_T$ and $I_G$) to the monitor 48.

The monitor 48 displays the manufacturing information I inputted from the conversion unit 47, so that a worker or the like can visually check the manufacturing information I. The monitor 48 is constituted with, for example, a cathode ray tube (CRT) display or liquid crystal (LCD) display. The worker or the like can obtain necessary manufacturing information I of the magnetic head slider 10 through the monitor 48.

[Method of Reading the Identification Mark 14]

The method of reading a mark according to the present invention will be described herein later.

(1) First, the magnetic head slider 10 is set in a predetermined position on the sample stage 40. The predetermined position on the sample stage 40 denotes a position in which the whole region where the identification mark 14b is formed in the magnetic head slider 10 substantially coincides with the whole region where the CCD camera 45 can pick up an image. As required, the controlling unit (not shown) operates the stage position control unit 41 to adjust the position of the sample stage 40 in the horizontal direction and the vertical direction, whereby fine adjustment of the image pickup position and focusing are performed. Then, the variable scaling factor of the image formation optical system 44 is adjusted.

(2) The illumination light irradiated at a virtually horizontal angle from the light source 42 is reflected by the half-mirror 43 and vertically comes onto the identification mark 14b of the magnetic head slider 10. Thus, the identification mark 14 of the magnetic head slider 10 is irradiated by the normal incident illumination light $L_I$.

(3) The CCD camera 45 picks up the optical image formed by the image formation optical system 44 and outputs the obtained video signal to the video signal recognition unit 46 in the image processing unit 50 as a video information $S_V$.

(4) The graphical symbol recognition unit 46b in the image recognition unit 46 captures the video signal $S_V$ inputted from the CCD camera 45 to perform pattern identifying processing, thereby identifying the graphical pattern comprising the identification mark 14b. Thus obtained the identified result is outputted to the conversion unit 47 as a graphical recognition signal $S_G$ by the graphical symbol recognition unit 46a.

(5) The conversion unit 47 converts the graphical recognition signal $S_G$ into corresponding manufacturing information $I_G$ using the graphical symbol conversion function $F_G$ which is pre-stored in memory. The converted manufacturing information $I_G$ is stored in memory (not shown) in the conversion unit 47 and is outputted to the monitor 48.

(6) The control unit (not shown) adjusts the position of the sample stage 40 by operating the stage control unit 41, and adjusts the variable scaling factor of the image formation optical system 44. Thus, the whole region where the identification mark 14a is formed in the magnetic head slider 10 coincides with the whole region where the CCD camera 45 can pick up an image.

(7) Similar to step (2), the normal incident illumination light $L_I$ is irradiated onto the identification mark 14a in the magnetic head slider 10.

(8) The CCD camera 45 picks up the optical image formed by the image formation optical system 44 and outputs the obtained video signal to the video signal recognition unit 46 in the image processing unit 50 as the video information $S_V$.

(9) The character symbol recognition unit 46a in the image recognition unit 46 captures the video signal $S_{Va}$ inputted from the CCD camera 45 to perform pattern identifying processing, thereby recognizing the string of character symbols comprising the identification mark 14a. Thus obtained the recognition result is outputted to the conversion unit 47 as a character recognition signal $S_T$ by the character symbol recognition unit 46a.

(10) The conversion unit 47 converts the character recognition signal $S_T$ into the corresponding manufacturing information $I_T$ using the character symbol conversion function $F_T$ which is pre-stored in memory. The converted manufacturing information $I_T$ is stored in memory (not shown) in the conversion unit 47 and outputted to the monitor 48 to be displayed. Consequently, the manufacturing information $I_G$ and $I_T$ of the magnetic head slider 10 are simultaneously displayed on the monitor 48 and the worker can acquire a manufacture history or the like of the magnetic head slider 10. More specifically, based on the manufacturing information $I_G$, one can learn the manufacturing number of the magnetic head slider 10, and the manufacturing number, manufacturing lot, and the like of a parent material (wafer) from which the base used in the magnetic head slider 10 has been separated. Further, based on the manufacturing information $I_T$, one can learn the address in the parent material from which the base used in the magnetic head slider 10 has been separated.

Next, image processing when the identification mark 14 is automatically identified in the image processing apparatus 50 will be described in detail. Here, described is a case where the identification mark 14b constituted with the graphical symbols is automatically identified by the graphical symbol recognition unit 46b in the image processing apparatus 50.

Figures 16A, 16B, 16C, 16D:
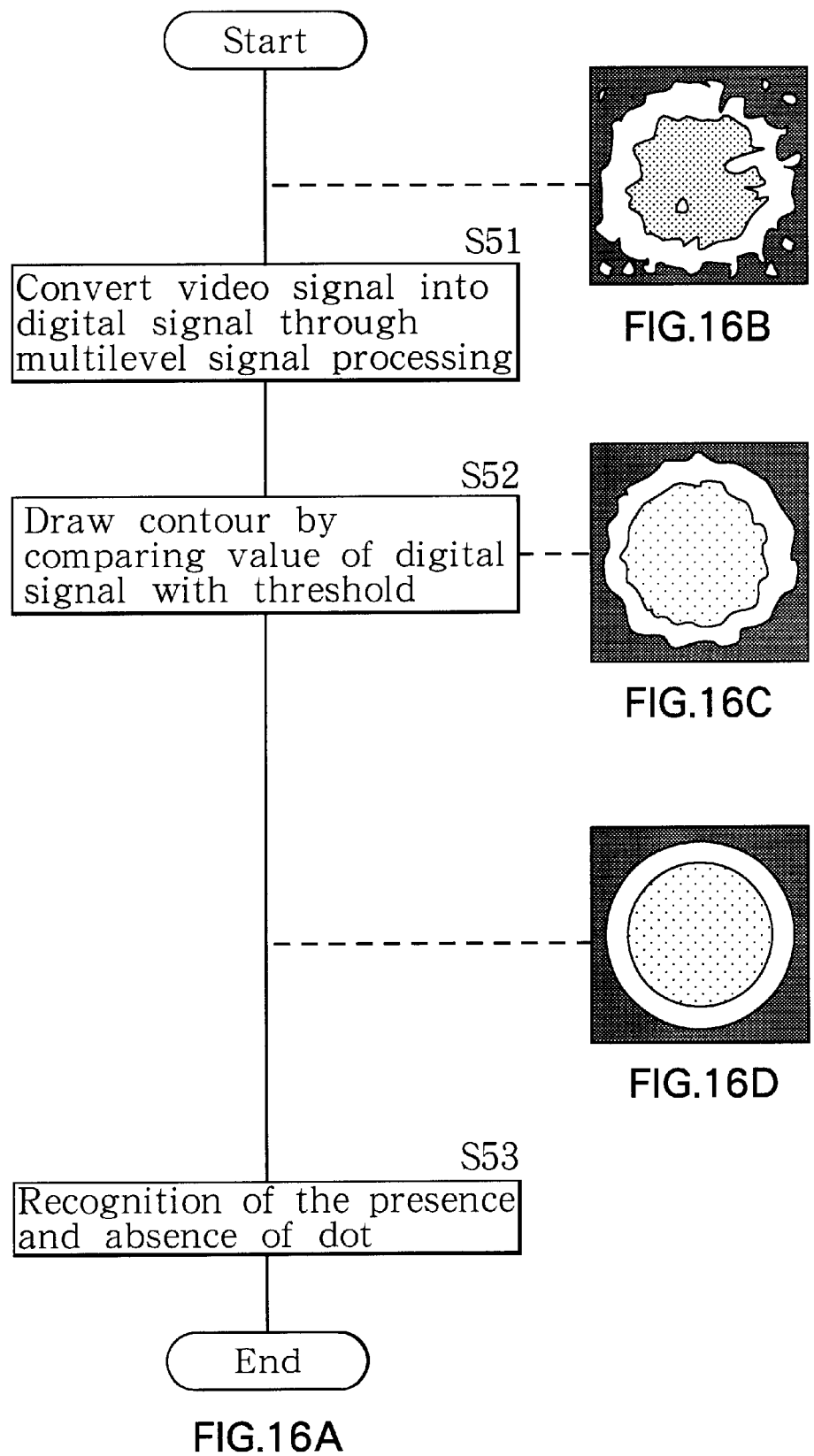
FIG. 16 is a flow chart explaining a process of image processing in the apparatus for reading a mark shown in FIG. 15.

FIG. 16 shows a process when the graphical symbol recognition unit 46 determines the presence or absence of the predetermined dot 14d forming the identification number 14b in the image processing unit 50. FIG. 16A shows the flow of the dot identifying process. FIGS. 16B through 16D are images in each step of the process shown in 16A.

(1) As shown in FIG. 16A, the graphical symbol recognition unit 46b performs multi-leveling processing on each analog video signal Sv corresponding to each pixel of the image (FIG. 16B) inputted from the CCD camera 45, whereby multileveled digital signals are obtained (StepS51).

(2) The graphical symbol recognition unit 46b compares obtained values of the multileveled digital signals of each pixel forming the dot 14d with the pre-stored threshold (a constant value or a function value), thereby drawing a data of contour image shown in FIG. 16C (Step S52). At this time, when the value of the multileveled digital signal of each pixel is greater than the threshold, the graphical symbol recognition unit 46b determines the value of the pixel to be "1". On other hand, when the value of the multileveled digital signal of each pixel is smaller than the threshold, the graphical symbol recognition unit 46b determines the value of the pixel to be "0".

(3) By comparing the data of contour image (FIG. 16C) with the pre-stored reference data (FIG. 16D), the graphical symbol recognition unit 46b determines whether the image data corresponds to the dot 14d or not. More specifically, when the matching ratio of both data is over a predetermined ratio (for example, 80%), for example, the graphical symbol recognition unit 46b determines the presence of a dot. When the matching ratio of both data is below the predetermined ratio, the graphical symbol recognition unit 46b determines the absence of a dot (Step S53). The judgment of the matching ratio can be performed based on the numbers of all pixels surrounded by the contour line (that is, an area) or arrangement thereof, or based on the numbers or arrangement of pixels on the contour line.

For the precise judgment of the presence or absence of a dot, difference in a luminance level contrast which allows precise differentiation between pixels corresponding to the dot 14d and pixels corresponding to the periphery of the dot 14d to be performed is necessary. According to the embodiment, since the normal incident illumination method is employed, the apparent difference in luminance exists between the pixel region corresponding to the dot 14d and the pixel region corresponding to the periphery of the dot 14d as in FIG. 17, for example. Thus, it is possible to precisely differentiate the pixel region corresponding to the dot 14d from the region corresponding to the periphery of the dot 14d.

Figure 17:
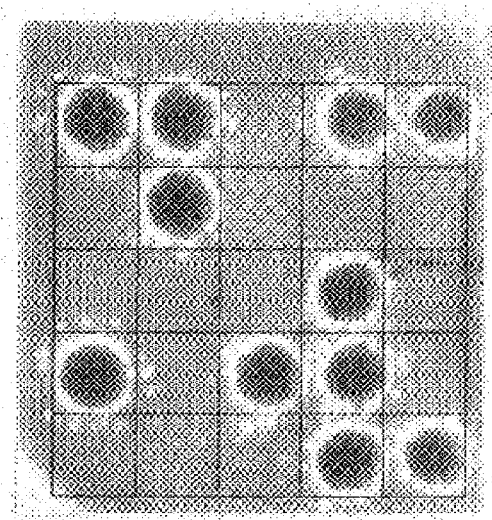
FIG. 17 is a micrograph obtained by the apparatus for reading a mark according to the embodiment of the present invention, showing one example of an image of the identification mark constituted with the dot pattern.
Figure 18:
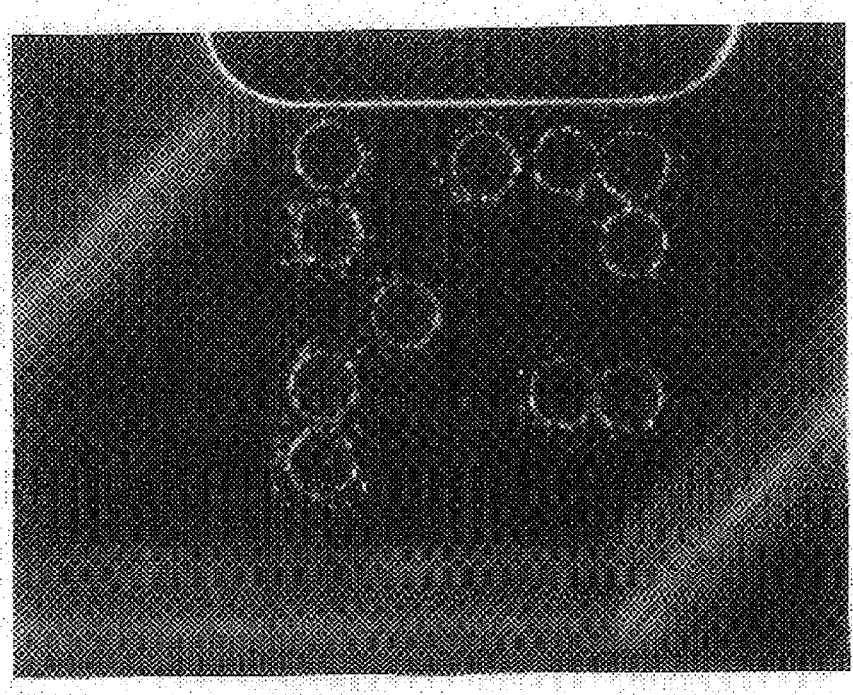
FIG. 18 is a micrograph obtained by the apparatus for reading a mark according to a comparison, showing one example of an image of the identification mark constituted with the dot pattern.

FIG. 17 is an example of a photographic image of the identification mark 14b taken by the CCD camera in the identification mark reading apparatus 60 of the embodiment. FIG. 18 is an example of a photographic image of the identification mark 14b taken by the CCD camera in an identification mark reading apparatus utilizing dark field illumination method as a comparison to the embodiment of the invention. Although in the micrograph shown in FIG. 17, the identification mark 14b does not overlap with the connection wiring patterns 13a through 13c shown in FIG. 12, the identification mark 14b may overlap with the connection wiring patterns 13a through 13c as in FIG. 12.

With the apparatus for reading an identification mark according to the comparison shown in FIG. 18, dark field illumination in which a light is irradiated in a slanted direction to a direction orthogonal to the surface where the identification mark is formed is performed and the identification mark 14b is imaged based on the reflected light. Thus, not only the contrast between the inside of the dot 14d and the periphery of the dot 14d but also the contour of the dot 14a is not clear.

On the other hand, according to the embodiment, the illumination light $L_I$ of the normal incident illumination method is irradiated on the identification number 14b, and the identification number 14b is imaged based on the reflected light $L_R$. Therefore, as shown in FIG. 17, the contrast between the inside of the dot 14d and the periphery of the dot 14b is high, thereby making it easy to precisely determine between the presence and the absence of the dot 14d. That is, not with manpower but rather with automatic identification, reading of the identification mark is practically feasible.

Incidentally, the same function as the aforementioned function which automatically identifies the identification number 14b may be provided in the character symbol recognition unit 14a, so that the identification mark 14a constituted with the string of character symbols is automatically read.

The reason why an image with high contrast is obtained using the normal incident illumination method in the embodiment as has been described above is considered to be as follows: With the art in Japanese Patent Laid-open No. Hei 7-141461 which has been described as one of the conventional arts of the invention, a mark is formed on a surface of a semiconductor wafer and the normal incident illumination method is used. In this case, a regular reflection light of a high intensity reaches an image pickup unit of the CCD camera, which causes deterioration in contrast. This is because the semiconductor wafer generally has a mirror-finished surface, whereby a reflection ratio is very high. On the other hand, according to the present embodiment, the mark is not directly formed on the base 1, but formed on the functional device structure (the thin film magnetic head device in the embodiment) on the base 1, or formed on the overcoat layer 148 comprising the protection film covering the functional device structure, whereby the reflection ratio is not very high. Consequently, the intensity of the reflected light from the region other than the region where the identification mark is formed is relatively low, which does not cause deterioration in contrast as above, but secures preferable contrast.

As has been described, according to the method of reading a mark and the apparatus for the same of the embodiment of the present invention, the normal incident illumination light is applied to the identification mark 14 provided on the magnetic head slider 10. Therefore, sufficiently high contrast with which the identification mark 14 is identified through the image processing is secured. Further, the obtained image signal is captured by the image processing apparatus 50 and is subject to the pattern identifying process. Thus, the identification mark 14 is identified and the result of the pattern identifying process is converted into the manufacturing information, whereby the manufacturing information corresponding to the identification mark 14 displayed on the magnetic head slider 10 is automatically obtained. Accordingly, time required for identification of the identification number 14, the conversion process into the manufacturing information or the like during the manufacturing process of the magnetic head slider 10 is extensively reduced. Further, the identification of the identification number 14 and the conversion process into the manufacturing information are precisely performed.

According to the embodiment, although described is a case where the identification mark 14 is read after the separation into the magnetic head sliders 10, the present invention is not limited to the present embodiment. For example, in any step before the separation into the magnetic head sliders as in FIG. 1, the identification number 14 may be read from the magnetic head block 2 or magnetic head bar 3.

Furthermore, in the embodiment of the present invention, described is a case where the identification mark reading apparatus 60 is used in the manufacturing process of the magnetic head slider 10, the invention is not limited to the embodiment. For example, the present invention may be applied to the control of manufacturing information of industry products or the like in various kinds of manufacturing fields (for example, a manufacturing field of a semiconductor device) except the magnetic head slider 10.

As described above, according to the method of reading a mark and the apparatus for the same of the invention, when reading the predetermined mark formed on the functional device structure layer or the protection layer in the functional device formation body in which included is at least the base, the functional device structure layer having the predetermined functional device structure formed on the base through the thin film process, and the protection layer covering the functional device structure layer, the illumination light of the normal incident illumination is irradiated onto the functional device formation body, and the mark formed on the functional device structure layer or the protection layer is read based on the reflected light from the functional device formation body. Accordingly, the contrast of the image obtained from the reflected light becomes clear and the mark is quickly and accurately read.

According to the method of reading a mark of one aspect of the invention, the dot pattern constituting the mark to be read is formed of the residue of the material melted on the protection layer by the irradiation of the predetermined energy beam or with the irradiation scar caused by the deterioration of the part of the protection layer by the irradiation of the energy beam. Consequently, the contrast of the image obtained from the reflected light becomes clear and mark reading is more desirably performed.

Obviously many modifications and variations of the present invention are possible in the light of the above teachings. It is therefore to be understood that within the scope of the appended claims the invention may be practiced otherwise than as specifically described.

What is claimed is:

1. A method of reading a mark, formed on a functional device structure layer or a protection layer in a functional device formation body including at least a base, the functional device structure layer having a predetermined functional device structure formed on the base through a thin film process and the protection layer covering the functional device structure layer, the method comprising steps of:

irradiating an illumination light of an normal incident illumination onto the functional device formation body; and reading the mark formed on the functional device structure layer or the protection layer based on a reflected light from the functional device formation body.

2. A method of reading a mark according to claim 1, wherein the mark has manufacturing information to be referred to in a manufacturing process of the functional device formation body.

3. A method of reading a mark according to claim 1, wherein the mark has origin identifying information which represents origin of the base included in the functional device formation body.

4. A method of reading a mark according to claim 1, wherein the mark includes at least either a dot pattern constituted with a plurality of dots or a character symbol.

5. A method of reading a mark according to claim 4, wherein the dot pattern is formed of a residue of a material melted on the protection layer by a predetermined irradiation of an energy beam.

6. A method of reading a mark according to claim 4, wherein the dot pattern is an irradiation scar caused by deterioration of a part of the protection layer by the irradiation of the energy beam.

7. A method of reading a mark according to claim 4, wherein the dot pattern represents a manufacturing lot of a parent material from which the base included in the functional device formation body has been separated.

8. A method of reading a mark according to claim 4, wherein the character symbol is formed simultaneously with a predetermined layer which is a part of the functional device structure layer.

9. A method of reading a mark according to claim 8, wherein the character symbol includes address information representing an address of the base in a parent material from which the base included in the functional device formation body has been separated.

10. A method of reading a mark according to claim 1, wherein the step of reading of the mark includes:

a process for generating an image data by photoelectrically converting the reflected light from the functional device formation body;

a process for obtaining an image pattern by performing image recognition based on the generated image data; and a process for obtaining information corresponding to the image pattern based on the obtained image pattern.

11. A method of reading a mark according to claim 1, wherein the functional device structure is a thin film magnetic head structure for performing at least one of recording and reproducing information to/from a recording medium.

12. An apparatus for reading a mark included in a functional device formation body including at least a base, a functional device structure layer having a predetermined functional device structure formed on the base through a thin film process, a protection layer covering the functional device structure layer and the predetermined mark formed on the functional device structure layer or the protection layer, the apparatus comprising:

a light source for irradiating a light, a normal incident illumination optical system for making it possible to irradiate a illumination light of a normal incident illumination onto the functional device formation body, and means for reading the mark formed on the functional device structure layer or the protection layer.

* * * * *